(12) United States Patent
Matsuzawa et al.

(10) Patent No.: US 6,514,630 B2
(45) Date of Patent: Feb. 4, 2003

(54) AU-BASED CLAD COMPOSITE MATERIAL, PRODUCING METHOD THEREOF AND MICROMOTOR USING THE SAME

(75) Inventors: Mii Matsuzawa, Nagano (JP); Hirotaka Sakamaki, Nagano (JP); Osamu Matsuzawa, Kanagawa (JP)

(73) Assignees: Sankyo Seiki Mfg. Co., Ltd., Tokyo (JP); Tanaka Kikinzoku Kogyo K.K., Tokyo (JP)

(*) Notice: Subject to any disclaimer, the term of this patent is extended or adjusted under 35 U.S.C. 154(b) by 40 days.

(21) Appl. No.: 09/884,951

(22) Filed: Jun. 21, 2001

(65) Prior Publication Data

US 2002/0018910 A1 Feb. 14, 2002

(30) Foreign Application Priority Data

Jul. 7, 2000 (JP) ..................................... 2000-207413

(51) Int. Cl.$^7$ .............................. B32B 15/01; C22F 1/14
(52) U.S. Cl. ........................... 428/672; 29/826; 29/874; 148/516; 148/527; 310/249; 310/251; 310/252; 428/673; 428/674; 428/908.8; 428/929

(58) Field of Search ................................ 428/672, 673, 428/674, 908.8, 929; 75/246; 310/249, 251, 252; 148/516, 527; 29/826, 874

(56) References Cited

U.S. PATENT DOCUMENTS 5,045,408 A * 9/1991 Williams et al. ............ 428/929

* cited by examiner

Primary Examiner—Robert R. Koehler
(74) Attorney, Agent, or Firm—Arent Fox Kintner Plotkin & Kahn PLLC

(57) ABSTRACT

To provide a contact material suitable for a commutator of a micromotor which can improve wear resistance and prolong the life of the micromotor by improving an Au-based clad composite material provided at an outermost layer with Au or an Au alloy. The present invention provides the Au-based clad composite material including a surface of a contact substrate having an Ag—Cu—Si alloy layer cladded with Au or the Au alloy, wherein an intermetallic compound Cu—Si is dispersed and deposited in Au or the Au alloy.

7 Claims, 2 Drawing Sheets

AU-BASED CLAD COMPOSITE MATERIAL, PRODUCING METHOD THEREOF AND MICROMOTOR USING THE SAME

BACKGROUND OF THE INVENTION

1. Field of the Invention

The present invention relates to a contact material used for a commutator of a micromotor.

2. Description of the Prior Art

Conventionally, Au, Au alloys, Ag alloys or the like are used for a commutator of a micromotor, and in many cases, composites of these alloys, which are known as clad composite materials are used in order to improve a sliding characteristic during use of the motor. The clad composite materials include a material comprising a surface of a contact substrate having an Ag alloy layer cladded with Au or the Au alloy at its outermost layer for the purpose of mainly providing corrosion resistance.

Au or the Au alloy used fore outermost layer of the clad composite material is excellent in the corrosion resistance and contact resistance characteristics but has a disadvantage that high wear resistance cannot be ensured since the material is soft. For this reason, if such an Au or Au alloy clad composite material is used for the commutator of the micromotor, it is prone to wearing and tends to limit the life of the micromotor.

SUMMARY OF THE INVENTION

In view of the above, the present invention is directed to provide a contact material suitable for a commutator of a micromotor which can improve wear resistance and prolong the life of the micromotor by improving an Au-based clad composite material which has been conventionally used and is provided with Au or an Au alloy at its outermost layer.

In order to solve the above problem, the inventors studied various clad composite materials which are cladded with Au or Au alloys at their outermost layers, and have found an Au-based clad composite material described below which improves the wear resistance. That is the Au-based clad composite material comprising a surface of a contact substrate having an Ag—Cu—Si alloy layer cladded with Au or the Au alloy, wherein an intermetallic compound Cu—Si is dispersed and deposited in Au or the Au alloy.

An Au-based clad composite material according to the present invention is a material such that a hard intermetallic compound Cu—Si is dispersed and deposited therein while an outermost layer, namely an Au or Au alloy layer maintains a sliding characteristics such as corrosion resistance or contact resistance characteristics which Au has at the same level as those of a conventional material, resulting in a substantial improvement in wear resistance. Consequently, the Au-based clad composite material according to the present invention provides a contact material suitable for a commutator of a micromotor.

The Au-based clad composite according to the present invention can be obtained by cladding a surface of a contact substrate having an Ag—Cu—Si alloy layer with Au or the Au alloy and carrying out heat treatment at 500 to 800° C. In the Ag—Cu—Si alloy obtained by melting and casting, Cu is dissolved in Ag but Si is difficult to be dissolved in Ag, so that Si combines with Cu to form the intermetallic compound Cu—Si, which is dispersed and deposited in the Ag—Cu—Si alloy. Cladding the surface of the Ag—Cu—Si alloy in such a condition used as a substrate with Au or the Au alloy and carrying out the heat treatment for joining at 500 to 800° C. cause the intermetallic compound Cu—Si in the Ag—Cu—Si alloy to be dispersed in Au or the Au alloy. In the present invention, a wording is used that the intermetallic compound Cu—Si is dispersed and deposited in Au or the Au alloy, which represents the condition that Cu—Si in the Ag—Cu—Si alloy of the substrate enters into Au or the Au alloy to be dispersed therein by the thermal diffusion.

When temperature of the heat treatment in this case is bellow 500° C., the intermetallic compound Cu—Si is difficult to be dispersed and deposited in Au or the Au alloy and production efficiency is reduced since heat treatment time needs to be maintained long. When the temperature is above 800° C., Ag reacts with Cu and the material itself begins melting.

Such a phenomenon of dispersion of the intermetallic compound Cu—Si in Au or the Au alloy by the thermal diffusion is confirmed for the first time as long as the inventors know. This phenomenon is found out in the combination of Au—Ag alloy with the Ag—Cu—Si alloy. Having studied this phenomenon, the inventors presume that the Au-based clad composite material according to the present invention can be obtained when the following requirements are met. First, since the intermetallic compound Cu—Si is formed in the Ag—Cu—Si alloy of the substrate, it is considered that the substrate alloy needs to include elements which easily forms an intermetallic compound with Cu. The element which forms the intermetallic compound with Cu is considered to be sufficient if it has nature of producing an Au alloy with a low melting point when combined with Au. Namely, for Si, it is considered that Si easily forms an intermetallic compound with Cu, and that when Au combines with Si, Si has the nature of producing Au—Si with a low melting point, thus providing the Au-based clad composite material according to the present invention.

The Au-based clad composite material according to the present invention is preferably a composite of Au or an alloy of Au and 1 to 70% by weight of Ag, and an alloy of Ag, 1 to 40% by weight of Cu and 0.05 to 10% by weight of Si. In the present invention, using Au as the outermost layer is better in terms of characteristics, but it is preferable to use the Au—Ag alloy when considering its cost. When using the Au—Ag alloy, a value of 70% by weight is recommended as an upper limit of Ag content since corrosion resistance which is a characteristic of Au is reduced when the Ag content exceeds the value. For the Ag—Cu—Si alloy used as the substrate, the intermetallic compound Cu—Si becomes difficult to be formed when the Cu content is bellow 1%, and the contact resistance becomes higher when it is above 40% by weight, thus the above range of content is recommended. Further, for Si, an amount of the intermetallic compound Cu—Si to be formed is reduced when the Si content is bellow 0.05%, which makes it impossible for the intermetallic compound Cu—Si to be sufficiently dispersed and deposited in Au or the Au alloy. When Si exceeds 10% by weight, workability deteriorates and a process such as forming in a sheet shape or the like tends to be difficult which is required for forming the clad composite material.

In the Au-based clad composite material according to the present invention, the Ag—Cu—Si alloy used as the substrate is cladded with Au or the Au alloy. The inventors, however, presume that the same effect can be obtained with an Ag—Si alloy used as the substrate. Si in the substrate does not form the intermetallic compound with Ag, which differs from the above presumption by the inventors, but Si is dispersed and deposited in the Ag because it is difficult to be dissolved in Ag. Si in the substrate (Ag—Si alloy) is considered to be dispersed and deposited in Au or the Au alloy which clads the same by thermal diffusion. Namely, forming the Au-based clad composite material by cladding the Ag—Si alloy as the substrate with Au or the Au alloy causes Si to be dispersed or deposited in the outermost layer in a condition that sliding characteristics such as the corrosion resistance or contact resistance characteristics which Au has are maintained at the same level as those of the conventional material, resulting in substantial improvement of the wear resistance.

Thickness of Au or the Au alloy for cladding is preferably 0.1 to 20 μm. Bellow 0.1 μm, Au is dispersed in the substrate and the corrosion resistance of the outermost layer cannot be maintained. Above 20 μm, the intermetallic compound Cu—Si is difficult to be sufficiently dispersed in Au or the Au alloy, which cannot achieve improvement of the wear resistance.

Using the Au-based clad composite material according to the present invention for the commutator of the micromotor can improve the wear resistance and thereby prolong the life of the motor. When using the Au alloy clad composite material according to the present invention for the commutator of the micromotor as described above, an Ag—Pd alloy is preferably used for a brush which is a counterpart of the commutator. Forming the micromotor with such a combination can stably achieve prolonging the life of the micromotor.

DETAILED DESCRIPTION OF THE PREFERRED EMBODIMENTS

Preferred embodiments of an Au-based clad composite material according to the present invention is described below. First, a method of producing the Au-based clad composite material of this embodiment is described.

As Example 1, ingots were formed respectively of Cu for a base layer, an alloy of Ag, 10% by weight of Cu and 1% by weight of Si for an intermediate layer, and an alloy of Au and 40% by weight of Ag for an outermost layer by a melting and casting method which were formed in sheet shapes. Then, each sheet was degreased and superposed upon each other, and formed in a clad manner by a pressure-welding machine. At this time, thickness of the base layer was 270 μm; the intermediate layer, 29 μm; and the outermost layer, 1 μm. The cladded material was thrown into a mixed gas atmosphere of $H_2$ and $N_2$ ($H_2:N_2=1:1$) and subjected to heat treatment at 600° C. for an hour to join the layers.

Figure 1:
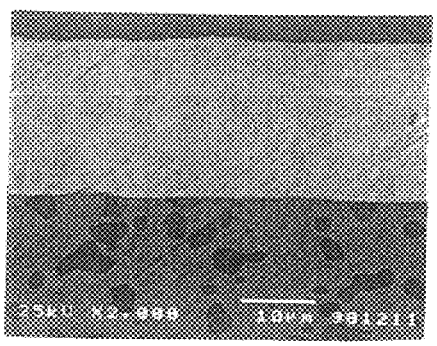
FIG. 1 shows a sectional texture before heat treatment of an Au-based clad composite material of an embodiment of the present invention.
Figure 2:
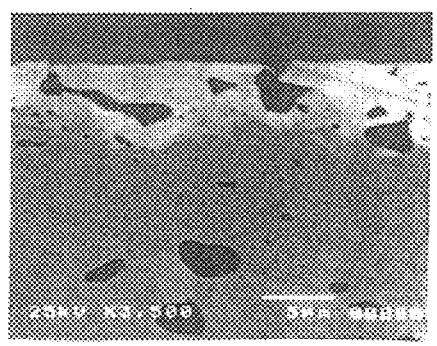
FIG. 2 shows a sectional texture after the heat treatment of the Au-based clad composite material of the embodiment of the present invention.

FIGS. 1 and 2 show a portion of a sectional texture before and after the heat treatment described above. FIG. 1 shows a condition before the heat treatment in which white portions show the outermost layer of the alloy of Au and 40% by weight of Ag and gray portions thereunder show the intermediate layer of the alloy of Ag, 10% by weight of Cu and 1% by weight of Si. Black portions in the intermediate layer show the intermetallic compounds Cu—Si. As seen from FIG. 2 which shows the condition after the heat treatment, the black portions seen in the intermediate layer are dispersed and deposited in the outermost layer. Analysis of the black portions with EPMA (electron probe microanalyzer) found in the outermost layer shown in FIG. 2 confirmed that they are the intermetallic compounds Cu—Si. For clearer sectional texture, a sample observed in FIGS. 1 and 2 has an alloy of Au and 40% by weight of Ag which is the outermost layer of a thickness larger than that in the above described Example 1 (FIG. 1 shown at a magnification of 2000 and FIG. 2 shown at a magnification of 3500).

Next, a life characteristics test is described in which the Au alloy clad composite material of Example 1 was used for a commutator of a micromotor. For comparison, life characteristics tests of the conventional clad composite materials were simultaneously carried out. As Comparative Example 1, a material with Cu as a base layer (270 μm thick), an alloy of Ag, 6% by weight of Cu and 2% by weight of Cd as an intermediate layer (29 μm thick), and an alloy of Au and 40% by weight of Ag as an outermost layer (1 μm thick) was used, and as Comparative Example 2, a material with the same configuration of each layer as Comparative Example 1 and with the outermost layer 5 μm thick was used. The method of producing the clad composite materials for Comparative Examples 1 and 2 are omitted since they are the same as in the case of Example 1 described above.

The life characteristics test was carried out under a test condition shown in the table below by preparing the micromotor using Example 1, Comparative Examples 1 and 2 for the commutator of the micromotor and using an alloy of Ag and 50% by weight of Pd for the brush. This life characteristics test is designed such that the outermost layer of the commutator and the brush slidably contact with each other in each example.

The life characteristics were tested through measurement to monitor at which cycle the motor stops when the micromotor is driven under the test condition. As life characteristics test environment, the micromotors were respectively located in two places of a low temperature atmosphere of −10° C. (50 to 60% humidity) and a room temperature atmosphere of 20° C. (20% humidity).

Figure 3:
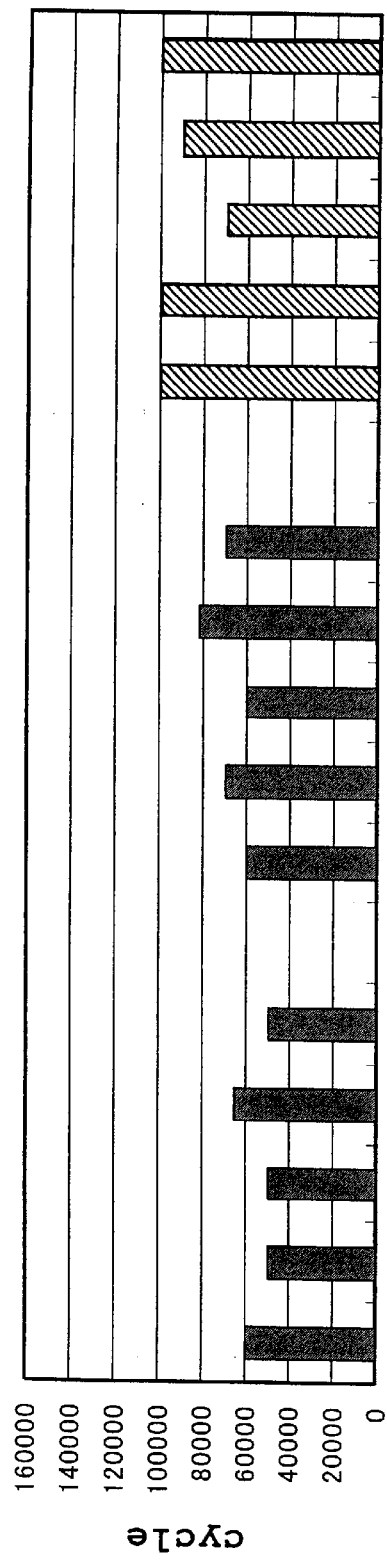
FIG. 3 is a bar graph showing a result of a life characteristic test at a low temperature.
Figure 4:
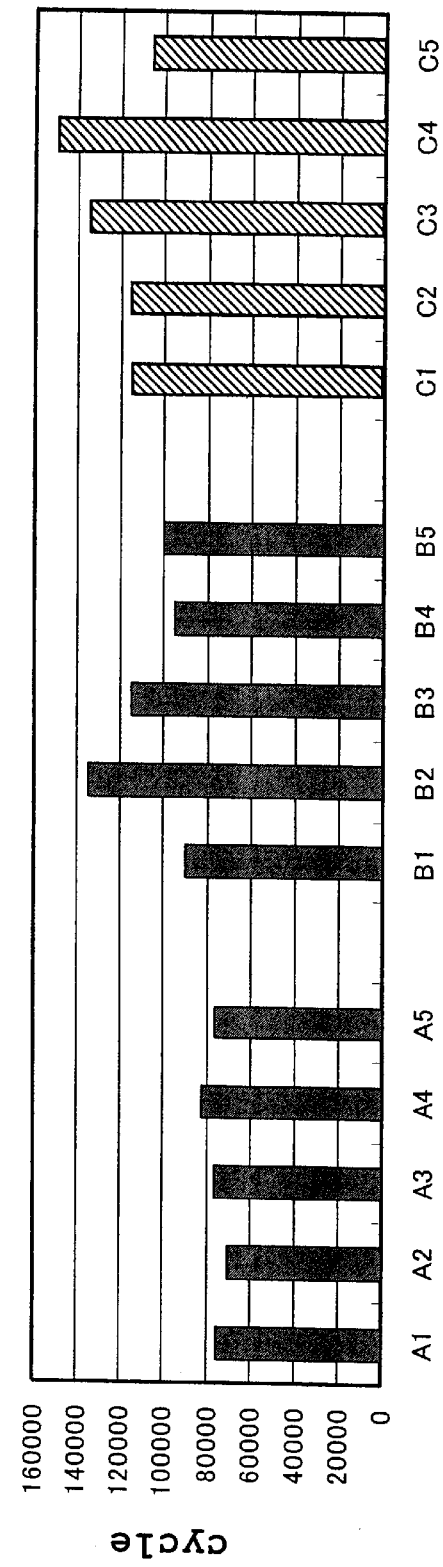
FIG. 4 is a bar graph showing a result of a life characteristic test at a room temperature.

FIG. 3 is a bar graph showing results of the life characteristics tests at a low temperature and FIG. 4 is a bar graph showing results at a room temperature. FIGS. 3 and 4 show the results of testing prepared five micromotors respectively for Example 1 (C1 to 5), Comparative Example 1 (A1 to 5) and Comparative Example 2 (B1 to 5).

As seen from the FIGS. 3 and 4, it was confirmed that the life of the micromotor of Example 1 is long. The average life values of respective five micromotors were 55000 cycles in Comparative Example 1, 68400 cycles in Comparative Example 2 and 92000 cycles in Example 1 in FIG. 3, and it was found that the life is prolonged on the order of 30000 cycles in the low temperature compared with the conventional examples. In FIG. 4, the average life values were 75800 cycles in Comparative Example 1, 108000 cycles in Comparative Example 2 and 124400 cycles in Example 3, and it was found that the life is prolonged on the order of 30000 to 50000 cycles in the room temperature compared with the conventional examples.

The present invention can improve the wear resistance maintaining the corrosion resistance as the conventional Au-based clad composite material. Therefore, the Au-based clad composite material of the present invention can be applied to the commutator of the micromotor to prolong the life of the micromotor.

What is claimed is:

1. An Au-based clad composite material, comprising a surface of a contact substrate having an Ag—Cu—Si alloy layer cladded with Au or an Au alloy, wherein an intermetallic compound Cu—Si is dispersed and deposited in Au or the Au alloy.

2. The Au-based clad composite material according to claim 1, further comprising a contact substrate having an Ag—Cu—Si alloy surface composed of 1 to 40% by weight Cu, 0.05 to 10% by weight Si and the balance of Ag cladded with Au or an Au—Ag alloy composed of 1 to 70% by weight Ag and the balance of Au.

3. A producing method of an Au-based clad composite material, comprising steps of: cladding a surface of a contact substrate having an Ag—Cu—Si alloy layer with Au or an Au alloy; carrying out heat treatment at 500 to 800° C.; and thereby dispersing and depositing an intermetallic compound Cu—Si in Au or the Au alloy.

4. A micromotor, comprising a commutator composed of the Au-based clad composite material according to claim 1.

5. A micromotor, comprising a commutator composed of the Au-based clad composite material according to claim 2.

6. A micromotor, comprising a brush composed of Ag—Pd slidably contacted with the commutator according to claim 4.

7. A micromotor, comprising a brush composed of Ag—Pd slidably contacted with the commutator according to claim 5.

* * * * *